INVENTOR.
RICHARD J. RIEKE
BY Ralph G. Hohenfeldt
ATTORNEY

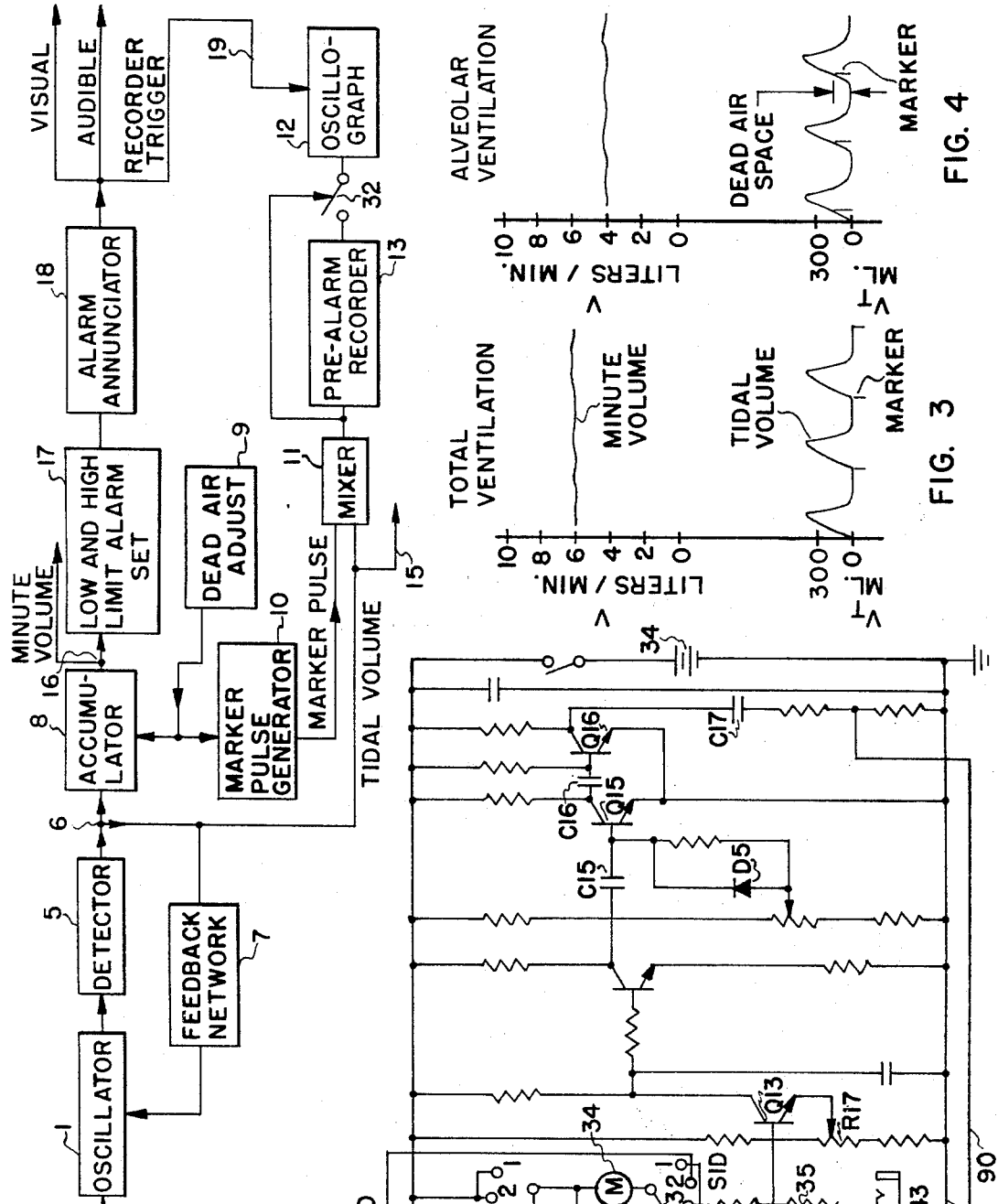

United States Patent Office 3,433,217
Patented Mar. 18, 1969

3,433,217
RESPIRATION MONITOR
Richard J. Rieke, Brookfield, Wis., assignor to General
Electric Company, a corporation of New York
Filed Sept. 30, 1965, Ser. No. 491,753
U.S. Cl. 128—2.08                                    7 Claims
Int. Cl. A61b 5/08

ABSTRACT OF THE DISCLOSURE

Transthoracic impedance variations due to respiration modulate the envelope of the waveform from a 100 kHz. oscillator. The amplitude modulated oscillations are negatively peak detected to produce a voltage analog of tidal volume. A feedback system attenuates impedance variations which are either above or below breathing rate. Dead-air space is subtracted from tidal volume and the residual signals are integrated over a one-minute time constant so that a voltage analog of average alveolar ventilation is displayed continuously.

---

This invention relates to a device for monitoring respiration of a subject indirectly; that is, by correlating electric impedance fluctuations across the thorax with respiration rather than by actually measuring the volume of air that is inspired and expired.

Objects of the invention are to provide a device that does not encumber or interfere with the normal breathing pattern of a subject so as to be suitable for long term continuous respiration monitoring; that does not impose consequential electric potentials on the body, and is unaffected by inherent body potentials; that does not have its output information affected adversely by body movements or drift in electrode contact impedance; and, that is easy to use, stable in operation, and safe from the viewpoint of the subject and operator.

Other objects are to provide a device that yields information about a subject's respiratory tidal volume, alveolar ventilation, and minute volume and permits their direct measurement.

Tidal volume as used herein means the volume of air inspired or expired by a subject during a single breath.

Minute volume is used herein to mean the total volume of new air moved into the respiration system each minute and is equal to the tidal volume times the respiration rate.

Alveolar ventilation is the total volume of atmospheric air entering the alveoli each minute and is equal to the tidal volume minus the dead air volume times the respiration rate. The dead air space is the volume of the respiratory passageways that does not contribute to gas exchange with the blood. It is made up of the nasal passageways, the pharynx, the trachea, and the bronchi.

In the drawings:

FIGURE 1 is a block diagram of the new respiration monitor;

FIGURES 3 and 4 are graphs which illustrate some of the information that is obtainable with the invention.

Figure 2A:
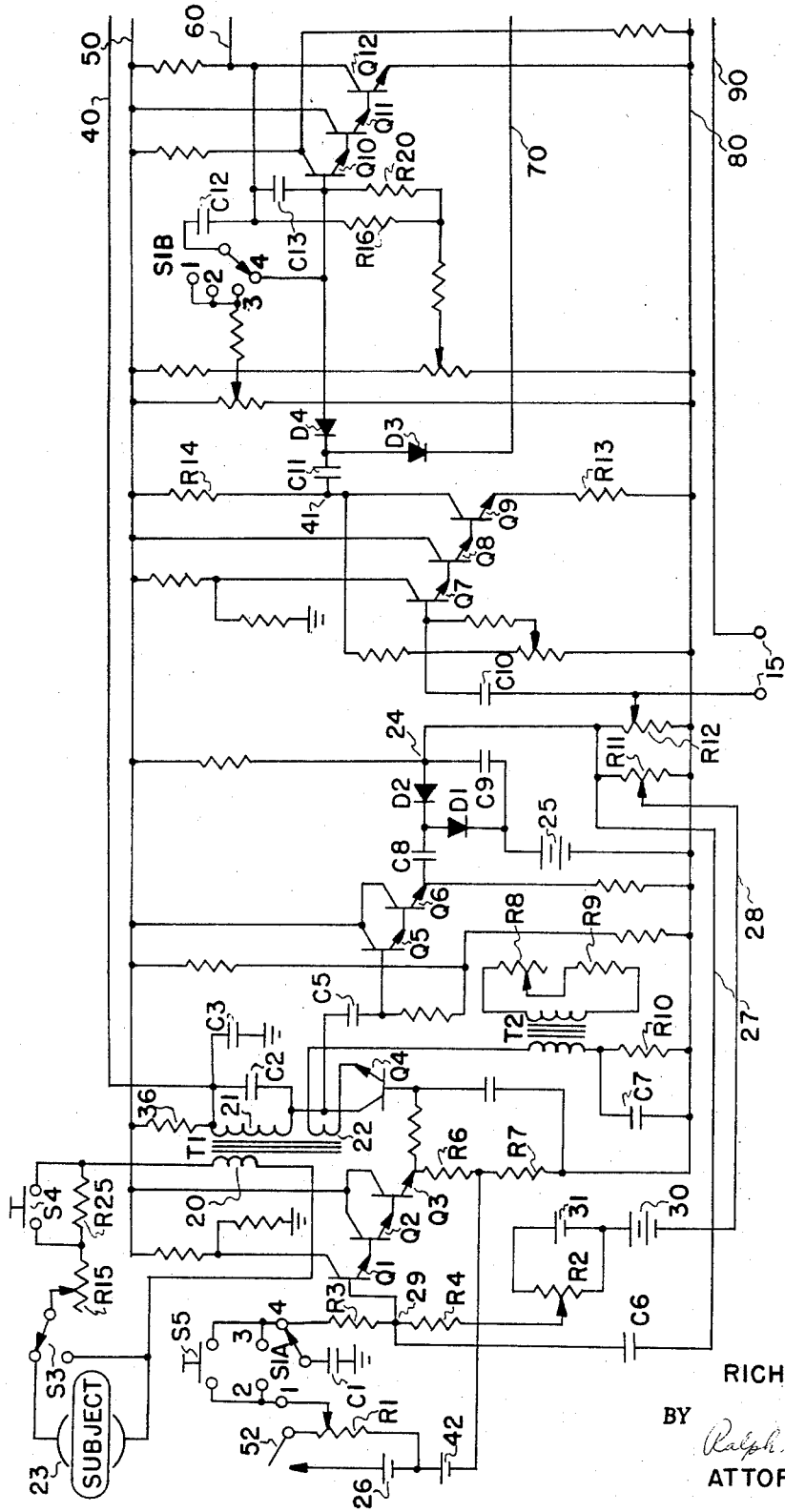
FIGURE 2 is a schematic diagram thereof broken into two parts, 2A and 2B, which are interconnected by conductors having the same reference numerals.

The main features of the new respiration monitor will first be outlined in reference to FIGURE 1 in which a high frequency oscillator 1 is shown. The input of the oscillator may be selectively connected by a switch 2 to either a test load 3 or a patient or subject 4. Although they are not shown in this figure, there are two electrodes attached to the subject's thorax so that the body constitutes an electrical impedance which varies cyclically with respiration and which loads oscillator 1 variably.

Oscillator 1 is of a type that puts out a high frequency voltage, at 100 kilocycles, for example. A frequency of this range is used in order to maximize the modulation of impedance by breathing. This relatively high frequency does this by effectively by-passing the skin impedance which has a comparatively large capacitive component. The magnitude of oscillations is affected by the load, which in this case is the impedance between two electrodes attached to the chest. Thus, transthorax impedance variations modulate the envelope of the high frequency oscillations.

The amplitude modulated oscillation is negatively peak detected in circuit 5 which yields a voltage analog signal appearing at point 6, which is representative of the body impedance variations occurring with each breath, and hence, this cyclic signal corresponds with tidal volume.

Also provided in a feedback network 7 connecting the output of the detector 5 with the oscillator 1. As will be explained in more detail later, this feedback network controls the oscillator so that it responds to impedance variations incident to respiration but not to higher or lower rate impedance variations that may be caused by body electrode contact pressure changes or by movement of parts of the body other than the thoracic cavity.

The tidal volume signal is supplied to the accumulator 8 which makes a continuous summation of the peak-to-peak value of the exhalations. At the same time this accumulator is continuously being discharged toward zero at a rate that is a direct function of the instantaneous accumulated voltage. The time constant of this operation is one minute. This results in continuous voltage analog signal at the output 16 of the accumulator 8 of the averaged minute volume. The one minute time constant is effective in filtering out variation in minute volume that occur at a rate greater than one cycle per minute. During the initial adjustment of the instrument, the one minute time constant is reduced by switching the circuit in order to expedite the procedure.

The accumulator 8 can be set to accumulate on the portion of each tidal volume signal that ventilates the alveoli. This is equal to the tidal volume minus the dead air volume. This is done by appropriately biasing some diodes in the accumulator by a circuit marked 9 and labeled Dead Air Adjust. The effect is to render the diodes conductive and to begin accumulation of each exhalation signal only after the dead air volume has been exceeded. The output of the accumulator is thus the voltage analog of alveolar ventilation.

Tidal volume may be displayed and recorded separately. Means are provided for putting a mark on the graph of each tidal volume wave to indicate the level at which subtraction of the dead air space occurs and to permit graphical measurement of the dead air space. A marker pulse generator 10 is provided for this purpose. When the above-mentioned diodes begin conducting, concomitant with the accumulator beginning to accumulate each consecutive tidal volume signal, the marker pulse generator is triggered to produce a marker pulse on the recorded tidal volume signal. The marker and tidal volume signals are mixed in a mixer 11 and sent to an oscillograph recorder 12 through a switch 32 for direct recording. In long term monitoring, it would probably not be desirable to operate the recorder continuously. For this mode of operation an endless loop magnetic tape pre-alarm recorder 13 is provided. In this manner, an oscillogram of an alarm event, including the time preceding the actual alarm condition, can be recorded by using the alarm annunciator to turn on the oscillograph.

For monitoring purposes, alveolar ventilation is thought to be the most significant of the various pulmonary ventilation functions. For this reason, the alarm condition is defined by it. In operation, if the patient's alveolar ventilation exceeds prescribed limits, the annunciator 18 would summon help and an oscillograph 12 would be turned on automatically to provide presentation and recording of the event, including a time period immediately preceding the alarm. The number of functions that could be so recorded are only limited by the number of recording channels available. Some of these that might logically be included would be electrocardiogram, body temperature, blood chemistry, and gas analysis. Also, the alarm activation could result from any of the monitored functions. Activating the alarm in response to breathing rate would be especially simple with the present invention.

One circuit embodying the features outlined above will now be described in greater detail in reference to FIGURE 2.

Attention is invited first to a transistor Q4 that is in the oscillator 1 circuit which may have a resonant frequency of preferably 100 kilocycles or some other relatively high frequency. The oscillator is also comprised of a fifty-turn secondary winding 21 of a transformer T1 in parallel with a capacitor C2 to form a tank circuit. The oscillation sustaining feedback is obtained from a one-turn secondary winding 22 of transformer T1, the winding 22 being in the emitter circuit of transistor Q4. Different turn ratios might be used with different transistors.

An oscillator such as this exhibits large changes in its output voltage amplitude for small changes in its load. In other words, it is easy to modulate the output signal envelope with small load impedance variations. This is because any change in load on an oscillator will change the loop gain of the oscillator so that oscillation will build up or down until this change in loop gain due to load change is compensated for by change in gain of the active component, such as a transistor or tube, due to its non-linear characteristic. In this case, load impedance variations are reflected into the secondary 21 of transformer T1 from a five-turn winding 20 which has the subject impedance in series with it by virtue of the subject's body being contacted by and disposed between two electrodes 23. In this design, potential imposed on the body is only 0.3 volt peak-to-peak. The electrodes may be pressed against the subject's body at opposite mid-axillary lines beneath the armpits. Disregarding other circuit components for the moment, it can be seen that instantaneous subject impedance variations due to respiration will modulate the oscillator through transformer T1 and as a result a high frequency signal that is amplitude modulated will appear on the collector of Q4.

Through a capacitor C5, this signal is coupled to the base of a transistor Q5 which in combination with Q6 constitutes a buffer-amplifier or impedance matching circuit which has an output impedance value that permits loading with a detector or demodulator. The signal to be detected is, of course, taken from the emitter of transistor Q6.

The detector is a voltage doubling rectifier which includes capacitors C8 and C9, and diodes D1 and D2. These components act to produce the negative peak envelope of the modulated 100 kilocycle signal at the circuit junction 24.

The voltage doubler detector operates as follows: the input signal to the base of transistor Q6 is an amplitude modulated 100 kilocycle signal. On the right side, as shown, of capacitor C8 the voltage cannot go higher than a predetermined positive voltage because it is clamped by batteries 25 which are rated 2.7 volts in this case. At the mid-point between diodes D1 and D2 then, the signal has the appearance of a 100 kilocycle signal, the positive portion of the envelope of which is clamped at 2.7 volts and the negative portion of the envelope of which is amplitude modulated by transthoracic impedance changes due to breathing. Thus, diode D2 and capacitor C9 negatively peak detect the amplitude modulated signal so as to give a detected signal at point 24 which is the voltage analog of tidal volume. This voltage is impressed on a potentiometer R12 on the arm of which appears a voltage representative of tidal volume and which is symmetrical about zero. The magnitude of tidal volume signal that appears on one of the output terminals 15 may be controlled by adjusting the arm of potentiometer R12.

The circuit described thus far is an open loop which would be subject to a D-C shift in tidal volume signal if the impedance of the circuit including the subject shifted in a steady-state value or the gain of the oscillator circuit changed. Such a D-C shift could be effected by a change in the contact impedance of electrodes 23 or by a change in the position of the subject. It is desirable that the equipment be insensitive to such spurious signals.

In order to make it insensitive to steady-state impedance changes, a feedback loop is connected around the oscillator. This feedback circuit controls the power gain of the oscillator and thereby the amplitude of its output voltage by way of base control of transistor Q4. D-C voltages at the base of Q4 will control the emitter current of this transistor and thereby control its power gain. Thus, if on a frequency selective basis, part of the tidal volume signal is fed back through appropriate circuitry to the base of transistor Q4, the peak-to-peak level of oscillation of the oscillator can be controlled. In other words, it is desired that the oscillator output be modulated by impedance changes corresponding with a subject's expected breathing rate change, which is usually between two cycles per minute and one cycle per second, and the oscillator output not be modulated by lower and higher rate impedance changes which might be incident to a patient moving in bed or to patient electrode contact variations.

Essentially, the feedback network comprises a resistor and capacitor in parallel with each other and connected between the input and output of an amplifier which in this case is between the base of Q4 and the anode of D2, respectively. From the input there is also a capacitor and resistor connected in series and to the other output terminal of the amplifier which is grounded in this case. Thus, the tidal volume signal on the output side of the detector is impressed across a potentiometer R11, in parallel with R12, with two parallel lines 27 and 28 running from it and rejoining at junction 29. In line 27 there is a capacitor C6. In line 28 there is a series circuit including the sliding contact arm of potentiometer R11, a network comprising batteries 30, 31 and potentiometer R2 and a resistor R4 all of which form a parallel circuit with C6 by virtue of junction 29 which is connected to the base of a transistor Q1 consisting the feedback input to amplifier transistor Q4. At junction 29, a series circuit begins which includes a resistor R3, contacts 3 or 4 of the A section of switch S1 and a large capacitor C1 which connects to ground.

The feedback voltage that appears at the base of transistor Q1 is determined by the frequency dependent attenuation characteristic of the series-parallel network described in the last two paragraphs. At very low frequencies, below breathing range, the attenuation of this network is zero and thus the full feedback voltage appears on the base of Q1. This is so because the impedance of capacitor C1 is essentially infinite at zero frequency. At frequencies much higher than those incident to normal breathing, capacitor C6 is a much lower impedance than resistor R3, and again, the full feedback voltage appears on the base of transistor Q1. Thus, for these two conditions, there is essentially unity feedback gain and the circuit will regulate the output.

For impedance changes in the frequency realm of breathing, the feedback network operates in a fashion that is opposite to that just described. In this case, the impedance of capacitor C6 in parallel with R4 is much higher than the impedance of R3 in series with C1 so that the feedback voltage impressed on the base of transistor Q1 is severely attenuated and no regulation occurs. In this manner only those impedance changes in the frequency realm of breathing will be reflected as an output voltage at point 24.

The feedback network action just described results in the circuit having the well-known Bode diagram type of response to frequency changes. In the present case, the circuit gain for input impedance frequencies above and below normal breathing frequencies is attenuated at standard single-slope six decibel per octave rates and the gain is flat over a range that includes breathing frequencies. An experienced electronic designer will, as in the instant case, select components to give a flat top frequency response over the desired range.

At point 29, the midpoint between resistors R3 and R4, the feedback network is connected to an interstage buffer-amplifier of the Darlington configuration, which comprises transistors Q1, Q2, and Q3 before being fed into the base of oscillator transistor Q4. Other impedance matching networks may be used in place of the Darlington circuit as long as they have near unity voltage gain, low noise, and a high input impedance and low output impedance to match impedance of the feedback circuit with the base circuit of the oscillator Q4. In operation, if the subject impedance is decreased, the oscillator will be loaded, decreasing the peak-to-peak oscillation amplitudes which will give a net positive going signal at the tidal volume output point 24 which is in turn fed back through the feedback network to the base of Q4. The effect is to increase the emitter current of Q4 to thereby increase the power gain of the oscillator and bring the level of oscillation back to its original value. Bias battery 25 reduces the unmodulated component of the detector output to zero, and hence, only variations in the subject impedance in the frequency realm of breathing will cause voltage on an output terminal 15 to deviate from zero. This voltage will be an analog of tidal volume.

In circuit with the winding 20 of tank transformer T1 is a switch S3 that enables by-passing the subject and inserting a potentiometer R15, and a series connected resistor R25 that is shunted by a push button switch S4, in the circuit for test and set-up purposes. Resistor R25 may have a low value, such as one ohm, so that when switch S4 is closed momentarily, with or without the subject in the circuit, a one ohm impedance variation will be introduced to give a dynamic calibration on the tidal volume signal output.

Potentiometer R15 may have a stop which obtains a maximum setting of a selected resistive value of 250 ohms in one embodiment. It will appear below that the 250 ohm setting is useful as a standard and that potentiometer may have a calibrated dial, not shown, from which the subject's static resistance can be read directly.

Before explaining the use of the circuit described in the last paragraph, it should be observed that in the emitter circuit of oscillator transistor Q4 there is a transformer T2 with a secondary that has a fixed resistor R9 and an adjustable resistor R8 connected across it. This is for degenerative control of the oscillator output impedance so as to permit the proper match with the subject load impedance.

Now with switch S3 in position to bypass the subject, R15 is adjusted to its 250 ohm position. R8 is adjusted to give a D-C emitter current in Q4 of 0.6 milliampere as shown on meter 34 with S1D in contact 2 position. To adjust the level of oscillation to the proper level with this standard load, resistor R2 in the feedback network is adjusted to yield zero volts on the tidal volume output terminal 15. R2 is associated with bias batteries 30 and 31. Switch S3 is then operated to put the subject back in the circuit and potentiometer R15 is adjusted until emitter current of Q4 again equals 0.6 milliampere. This condition will exist when the total of the series resistance of R15 and the patient is equal to 250 ohms. Thus, if the dial is displaced to read zero when R15 is set to equal 250 ohms, it will now read the static resistive component of the parallel resistive-capacitive equivalent 100 kilocycles body impedance. The foregoing adjustments are made with switch S1A in its position 2 to obtain a more rapid response in terms of D-C feedback during initial setup of the oscillator.

Also, with switch deck S1A in position 2, initial conditions are being established on the relatively large capacitor C1. This is accomplished with potentiometer R1. Depressing a push button switch S5, applies the voltage from the contact arm of R1 onto the base of transistor Q1 at a much lower impedance level than that of the oscillator feedback network. Thus, in this condition, operation is on open loop control of the oscillator by way of voltage on C1 established by potentiometer R1. Adjustment of potentiometer R1 to produce zero volts on tidal volume output terminal 15 then sets up the initial condition on capacitor C1. Batteries 26 and 42, which may be 1.35 volts each, enable developing the proper voltage on R1. The voltage reference for establishing initial conditions on C1 is derived from the midpoint of resistors R6 and R7 in series with the emitter of Q3. This is to introduce compensation for variations in supply voltage from battery 34.

A capacitor C7 and paralleled resistor R10 near transformer T2 and connected into the emitter circuit of Q4 introduces D-C gain stability and increased D-C input impedance to Q4.

The circuit and operation thereof thus far described results in a voltage analog of respiration tidal volume air exchange appearing on the contact arm of resistor R12 and terminals 15. When recorded or displayed on an oscillograph, the cyclic variations of tidal volume appear as in the graph so marked in FIGURE 3 and in FIGURE 4. An expected tidal volume value for a normal relatively quiescent patient or subject is about 500 milliliters per breathing cycle and at a rate of around 12 to 16 cycles per minute. These values change markedly with activity of the subject and with other physiological conditions.

The description will now proceed with an explanation of that part of the device which develops either the minute volume signal or preferably the alveolar ventilation signal. This is often more meaningful information because the patient cannot readily alter it by conscious effort. In other words, if the subject forcibly over-ventilates or under-ventilates for several cycles, the tendency for the body is to control subsequent breathing rate and depth commensurate with carbon dioxide balance in the lungs and hence its metabolic needs. Alveolar ventilation therefore is more indicative of a patient's respiration trend.

In FIGURE 2, the cyclic tidal volume signal is coupled through a capacitor C10 to the base of a transistor Q7 which forms a high input impedance amplifier with transistors Q8, Q9, and resistors R13 and R14. A single transistor with the proper matching impedance parameters might be substituted for the transistors just mentioned. Moreover, since the bias circuits are quite conventional and dependent on the type of transistor used, they will not be discussed in accordance with the custom so far.

The gain of this amplifier is established by the ratio of R14 and R13, and is approximately ten in this example. It will be evident that the amplified tidal volume signal will appear on the collector of transistor Q9 such as at the point marked 41. Capacitor C11, diodes D3 and D4, and an amplifier comprising transistors Q10, Q11, and Q12 and a feedback circuit which for the moment shall be considered as consisting only of capacitor C12, comprises what for convenience is called a diode pump. The functions of this circuit are those of the accumulator 8 in FIGURE 1 as previously outlined. It operates to accumulate the voltage analog of the summation of the exhalation portions of the tidal volume signal for recordation as minute volume or alveolar ventilation in terms of liters per minute as shown in FIGURES 3 and 4.

Operation of the diode pump will now be described. For convenience, first consider the cathode of diode D3 to be grounded. The amplifier comprising Q10–12 with its associated feedback, produces a virtual ground at the anode of diode D4. Thus, as the tidal volume voltage increases positively, displacement current in capacitor C11 must flow through D3. As tidal volume voltage changes in a negative direction, the displacement current then flows through diode D4. Since the amplifier is designed to have a high input impedance much like an operational amplifier, this displacement current must come from capacitor C12 in the feedback circuit. This displacement current charges C12 so that the voltage appearing on the collector of Q12 is proportional to summations of the displacement currents flowing through diode D4. If the tidal volume signal is fed into this circuit through capacitor C11 for a minute, a voltage analog of minute volume appears on the collector of transistor Q12. To avoid the need for the periodic sample, hold and reset type of operation implied by the above described operation, resistor R16 is placed in parallel with capacitor C12. In this way, capacitor C12 is continuously discharged with a one minute time constant. The effect is to give a continuous analog voltage of the average minute volume. With switch S1C in position 4, the minute volume voltage may be taken off for utilization from terminal 16.

The manner of obtaining alveolar ventilation and the manner of subtracting dead air volume from the tidal volume recorded signals will now be described. Although the foregoing explanation of the diode pump assumed that the cathode of diode D3 was grounded, it can be seen in FIGURE 2 that the cathode is connected to ground through the low impedance path of the base-to-emitter circuit of a transistor Q13 and a potentiometer R17. Thus, transistor Q13 detects when diode D3 begins to conduct and Q13 also acts as an amplifier. When diode D3 conducts, a negative voltage transient appears on the collector of Q13 and this is used to trigger a multivibrator which includes transistors Q15 and Q16 and some associated capacitors and resistors which will not be described further, because multivibrator circuits are well-known. It is sufficient to say, that the output of the multivibrator, that is, the collector of Q16, has a short voltage pulse on it at any time that diode D3 becomes conductive.

The circuitry described above, excluding diode D3, is designated marker pulse generator 10 in FIGURE 1. In FIGURE 2, it is seen that the marker pulse taken from the collector of Q16 is coupled through capacitor C17 with the tidal volume output signal terminals 15 by way of a conductor 90. In FIGURE 1, it is evident that the marker pulse and tidal volume signals are introduced into an electronic mixer 11 to produce a composite signal or may be fed directly into a differential amplifier, not shown, and recorded on a single channel in any suitable recorder. There can be no cross-talk between the voltage sources of tidal volume and the marker pulse or the accumulator will accumulate the marker pulses which is undesirable. Thus, in reality, mixer 11 includes a differential amplifier which accepts these signals isolated from each other and combines them in its output to allow recording with a single pen recorder.

In the recorded plot of tidal volume in FIGURE 3, it is seen that the marker pulse is imposed at the beginning of an inspiration. When seeking alveolar ventilation and thereby accounting for dead air space in the tidal volume determination, R17 is adjusted so that the marker pulse appears at some appropriate incremental volume subsequent to the start of inspiration. As an incident, true alveolar minute ventilation in liters per minute, which is equal to minute volume minus the minute dead air ventilation, is recorded in accordance with FIGURE 4.

The control of the back bias which determines when diode D3 and D4 become conductive, and hence, adjusts the dead air volume portion of the tidal volume, is accomplished by adjusting potentiometer R17 in the emitter circuit of transistor Q13. This amounts to selective reverse biasing of diodes D3 and D4 so that accumulation of tidal volume to determine the minute volume or alveolar ventilation begins at the point in time that the marker pulse occurs.

FIGURE 1 shows the minute volume signal being supplied to a limit alarm 17 which is not otherwise shown in detail, except insofar as it is demonstrated in FIGURE 2 that this connection can be made from an alarm jack 43. Limit alarms are known in the medical electronics art, and one that is appropriate for use here is basically a voltmeter which is adapted to close an alarm circuit by making an electric contact at upper and lower limit settings. The annunciator 13 in FIGURE 1 is also within the capability of a reasonably skilled designer, and although its details are not shown, it includes means for creating audible and visual signals for alarm conditions. In a commercial embodiment of the present invention, there is a pre-alarm recorder 13 which records respiration on an endless magnetic tape loop on which the readout, erase and record head are mounted close together in that order. This results in a time delay between recording and playback proportional to the length of the tape loop. Thus, given an alarm event, the resulting oscillogram as recorded from the pre-alarm record will include information about the respiration pattern immediately preceding the alarm event. Should it be desirable, the pre-alarm recorder can be bypassed to enable recording of current respiration patterns.

In order to adjust the limit alarm meter without waiting for a minute before the diode pump stabilizes at the correct minute volume or alveolar ventilation, the time constant capacitor C12 may be switched out of the circuit with switch S1B, leaving capacitor C13 in the circuit with a parallel resistor R20. This does not affect the gain, but changes the time constant of the diode pump from one minute to six seconds. This is done to allow adjusting the gain of the tidal volume potentiometer R12 until the minute signal produces mid-scale deflection on the meter after which capacitor C12 is switched back into the circuit for a one minute time constant.

The rotary switch S1, it is noted, has four decks which are designated S1A to S1D. Each deck has four positions marked 1 to 4. The functions of this switch will now be recapitulated.

When in position 1, S1A is set to establish initial conditions on capacitor C1 and also connects the feedback circuitry so as to expedite the adjustment of R15. S1B is set to establish the time constant of the accumulator at six seconds. S1C and S1D connect the meter 34 between ground and the power supply, which is a 22½ volt battery 34, along with some resistors which make the meter deflect full scale at a nominal 22 volts. This illustrative circuit operates on 18 to 22 volts. When in this position, a potentiometer 35 is adjusted until the meter reads full scale. If this is beyond the limits of adjustment, a weak battery is indicated and should be replaced. This step also sets meter 34 for accepting the maximum output of the accumulator or diode pump since the latter is limited by the battery 34 voltage. The accumulator will normally deflect the meter to half scale when the tidal volume gain is adjusted by way of potentiometer R12 to the mid-point.

When in position 2, decks S1A and S1B are connected the same as in the preceding paragraph. S1C and S1D connect meter 34 across a fixed resistor 36 which is located above the tank transformer T1 in the diagram and is in the collector circuit of oscillator transistor Q4. The meter then acts as a 1.2 milliampere full scale ammeter. This enables establishing the static conditions of the oscillator by providing the means of measuring the 0.6 milliampere referred to earlier.

When in position 3, S1A reconnects the feedback around oscillator 1, or in other words, to transistor Q4 so it is again sensitive to load impedance changes due to breathing. S1B is set as in positions 1 and 2 so the accumulator will still have the relatively short six second time constant. S1C and S1D connect the meter 34 to the collector of transistor Q12, which is the same as the output of the accumulator, so that the meter indicates in correspondence with minute volume or alveolar ventilation derived with a six second time constant.

In position 4, S1A is connected the same as in the preceding paragraph; that is, to effect feedback for normal operation. S1B is connected for producing minute volume or alveolar ventilation signals with a one minute time constant. S1C and S1D are connected as in position 3 except that operation is with a one minute time constant because of the way S1B is now connected.

In summary, the invention is seen to have numerous unique and advantageous features. All measurements can be made without encumbering or endangering the subject. Tidal volume signals are obtained with a stable base line and with equal sensitivity response over the entire range of breathing frequencies. Spurious signals are avoided. A large tidal volume signal is developed using a small thorax excitation potential as a result of using thorax impedance variation as the modulation signal to control an oscillator instead of taking the conventional approach of trying to amplify a voltage divider derived signal to a useful level. For example, in an embodiment of the invention, a one percent change in body impedance modulates the oscillator by fifteen percent.

In addition, the invention enables obtaining an output signal that is a continuous function of average minute volume or averaged alveolar ventilation. This information is most useful. It also permits alveolar ventilation to be determined and displayed and dead air space to be accounted for in a manner that may be particularized to the subject under study. The subject's static impedance can be determined too.

Although the components of the new system have been shown and described as comprising particular electronic circuits for the sake of demonstrating principles and concepts, and to enable those versed in the art to reproduce the invention, it should be understood that the description is illustrative rather than limiting and that the invention may be variously embodied. Accordingly, the scope of the invention is to be determned only by interpretation of the claims which follow.

It is claimed:

1. A respiration monitor that is characterized by the production of a signal which is a function of the respiration volume per unit time comprising:
   (a) means producing an electric signal that is the analog of tidal volume,
   (b) means utilizing the electric analog of tidal volume to produce an electric analog of respiration air flow, said utilizing means including a circuit that differentiates the tidal volume signal with respect to time to produce an air flow signal as a function of time,
   (c) means selectively directing an inhalation or exhalation component of air flow signal in a predetermined path, and
   (d) an integrator means receiving the selected component of flow analog signal and producing the time integral of said signal the total value of which represents the electrical analog signal of air volume for the period and is the summation of the selected component for the period.

2. The invention set forth in claim 1, having the summation signal a continuous function of average respiration volume per unit time averaged over a period of time, wherein said integrator comprises:
   (a) a high input impedance inverting amplifier having a feedback capacitor connected between its input and output and a resistor in parallel with the capacitor,
   (b) the time constant of the parallel resistor and capacitor being such that the output signal of the amplifier is an analog of a continuous function of average volume per unit time when said flow signal is continuously applied to the input of the amplifier.

3. A monitor for measuring respiration tidal volume comprising:
   (a) a fixed frequency oscillator that is adapted for modulation of its output signal by introducing in it transthoracic impedance variations that are incident to respiration,
   (b) a circuit coupled with the oscillator for introducing the impedance variations and including electrodes adapted to connect a living subject to the circuit to modulate the oscillator by impedance variations accompanying breathing,
   (c) a detector means connected to receive the modulated output signal and produce a signal that has a D-C component and a time varying component that is representative to tidal volume,
   (d) biasing means comprising a source of D-C voltage that opposes the D-C component,
   (e) a frequency sensitive feedback circuit coupled between the detector output and oscillator for regulating the amplitude of the oscillator output voltage,
   (f) the said feedback circuit being adapted to attenuate feedback signals in the frequency range of breathing whereby the oscillator will not be regulated, and to leave substantially unattenuated feedback signals at frequencies above and below the range of breathing frequencies, whereby the said amplitude will be regulated,
   (g) a switching means to change the feedback circuit so as to regulate the oscillator output independent of the rate of transthoracic impedance change in order to facilitate initial set-up of the monitor with the subject,
   (h) a source of D-C potential,
   (i) a capacitor adapted to be out of the feedback circuit and to be precharged from the source of D-C potential when the switch means is in one position to a value equal to the required bias on the oscillator input to enable switching to the other position without introducing a transient,
   (j) said oscillator being insensitive to transthoracic impedance changes when the capacitor is connected to said D-C source and when so connected permitting said oscillator to be adjusted to a standard impedance value in the transthoracic impedance circuit,
   (k) said standard impedance value being comprised of a series combination of an adjustable known resistor and the transthoracic resistance,
   (l) whereupon said capacitor may be switched back into the feedback circuit without introducing any significant transient and thereby re-establish the closed loop response of the oscillator to be sensitive to resistance variations incidental to normal breathing.

4. A respiration monitor that is characterized by the production of a signal that is a continuous function of the minute volume, comprising:
   (a) a means for producing an electric voltage signal that is the analog of tidal volume,
   (b) a capacitor, one side of which receives the tidal volume analog voltage and the other side of which is maintained at a constant voltage, so that the displacement current into this capacitor is the current analog of air flow in the respiration system,
   (c) first and second diode means,
   (d) constant voltage sources,
   (e) an integrator means,
   (f) a means of separating the displacement current into two circuits, one of which conducts the current analog of inhalation air flow and the other of which conducts the current analog of exhalation air flow, by connecting the constant voltage side of the capacitor to the cathode of the first diode and the anode of the second diode, where the opposite sides of each diode are connected to the constant voltage sources the magnitudes of which will just bias the diodes off, (g) the anode side of the first diode being connected to the input of said integrator means which produces an output voltage equal to the time integration of the input current, and which comprises a high gain, high input impedance inverting amplifier with capacitor feedback around it, so that if the current analog of either inhalation or exhalation air flow is connected to the input of the amplifier for a minute, the output voltage change of the amplifier corresponds to minute volume, (h) a resistor that is also connected in the feedback circuit around the amplifier in parallel with the capacitor so as to produce a time constant with said capacitor and a signal at the output of the amplifier that is a continuous function of average minute volume when tidal volume signal is continually applied to the input, wherein any variations in minute volume that occur above a certain frequency will be attenuated, (i) a manual switching means connected to a point on the capacitor to enable reducing the value of the capacitor so as to reduce the time constant and provide fast build-up of the integrated output voltage to the level that corresponds to minute volume.

5. The invention set forth in claim 4 including a means for producing a signal that is a continuous function of the average alveolar ventilation comprising:

(a) a controllable bias voltage connected to the cathode side of the second diode, that in conjunction with the fixed voltage applied to the anode of the first diode, will keep the two diodes biased off and thereby prevent displacement current from flowing into the capacitor connected between the midpoint of these two diodes and a voltage analog of tidal volume until the tidal volume voltage signal progresses from either the peak of inspiration or expiration an increment of voltage that corresponds to the dead air space in the respiration system, (b) the anode side of the first diode being connected to the input of said integrator that includes a time constant so as to develop an output voltage signal that corresponds to a continuous function of average alveolar ventilation from a cyclic input voltage that is the analog of tidal volume minus dead air volume.

6. The invention set forth in claim 5 including:

(a) a means for detecting when displacement current first starts to flow through the second diode comprising a high gain current-to-voltage converter the input of which is placed in series with the second diode, (b) a means of generating a standard marker voltage pulse comprising a pulse generator that is triggered each time the second diode goes into conduction, (c) a means for mixing the marker pulse with the tidal volume signal to provide for the recording or presentation of the composite signal to enable an operator to adjust the bias across the diodes so as to have a measurement of the amount of dead air provided for.

7. An instrument for monitoring respiration comprising:

(a) a circuit adapted to include transthoracic impedance, which impedance variations correlates with cyclic tidal volume, (b) a means of obtaining a voltage analog signal of tidal volume from the impedance variation across the thorax of a subject, (c) a means to develop a voltage that is a continuous function of averaged minute volume from the tidal volume signal, (d) a means to exclude that portion of the tidal volume signal that corresponds to dead air space volume in the respiratory system so as to enable the development of a voltage that is a continuous function of averaged alveolar ventilation from the tidal volume signal, (e) a means to display either the minute volume or alveolar ventilation analog signal, (f) a means of generating a marker pulse voltage that will occur in time at the instant the tidal volume signal has progressed from either peak inhalation or peak exhalation an adjustable amount equal to the aforementioned dead air volume, (g) a means of mixing the tidal volume and marker signal to produce a composite signal, (h) a means to produce an alarm signal upon the condition of minute volume or alveolar ventilation exceeding prescribed and adjustable limits, (i) a means for time delay storage of the tidal volume signal, (j) a means to activate an alarm annunciator to summon assistance to an alarm condition, (k) a means to record for immediate viewing and future record the (1) tidal volume signal and (2) the minute volume or alveolar ventilation, (l) a means for initiating this recording, either on demand or as the result of an alarm, (m) a means for recording either in immediate time or delayed time, (n) a means of making the respiration monitor compatible with a monitoring system including other physiological functions by providing a multiplicity of (1) inputs into the alarm annunciator and (2) channels in the time delay storage and recording mechanisms.

References Cited

UNITED STATES PATENTS

| 2,831,181 | 4/1958 | Warner | 340—213 |
| 3,149,627 | 9/1964 | Bagno | 128—2.1 |
| 3,212,496 | 10/1965 | Preston | 128—2.1 XR |
| 3,217,706 | 11/1965 | Sullivan | 128—2.1 |
| 3,232,288 | 2/1966 | Krobath | 128—2.08 |
| 3,316,902 | 5/1967 | Winchel et al. | 128—145.5 |
| 3,324,848 | 6/1967 | Domeier et al. | 128—2.08 |
| 3,347,223 | 10/1967 | Pacela | 128—2.08 XR |

OTHER REFERENCES

Geddes, L. A., et al., The American Journ. of Med. Electronics, April–June (1964), pp. 16–27 relied on.

McCally, M., et al., The American Journ. of Med. Electronics, October–December (1963), pp. 322–327 relied on.

RICHARD A. GAUDET, *Primary Examiner.*

K. L. HOWELL, *Assistant Examiner.*

U.S. Cl. X.R.

128—2.1; 73—194; 324—61